US012012059B2

(12) United States Patent
Frost et al.

(10) Patent No.: US 12,012,059 B2
(45) Date of Patent: *Jun. 18, 2024

(54) VEHICLE COMPONENT FOR A VEHICLE

(71) Applicant: Benteler Automobiltechnik GmbH, Paderborn (DE)

(72) Inventors: Georg Frost, Steinheim (DE); Andreas Hitz, Erwitte (DE); Mathias Lohberg, Altenbeken (DE); Martin Schroeter, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 364 days.

This patent is subject to a terminal disclaimer.

(21) Appl. No.: 17/500,138

(22) Filed: Oct. 13, 2021

(65) Prior Publication Data

US 2022/0063530 A1 Mar. 3, 2022

Related U.S. Application Data

(63) Continuation of application No. 16/693,625, filed on Nov. 25, 2019, now Pat. No. 11,161,468.

(30) Foreign Application Priority Data

Nov. 26, 2018 (DE) ...................... 10 2018 129 724.6

(51) Int. Cl.
*B60R 19/03* (2006.01)
*B60R 19/02* (2006.01)
*B60R 19/18* (2006.01)
*B62D 21/15* (2006.01)

(52) U.S. Cl.
CPC ............ *B60R 19/03* (2013.01); *B60R 19/023* (2013.01); *B60R 19/18* (2013.01); *B62D 21/152* (2013.01); *B60R 2019/1813* (2013.01)

(58) Field of Classification Search
CPC ....... B60R 19/03; B60R 19/023; B60R 19/18; B60R 2019/1813; B62D 21/152; B62D 21/15; B62D 25/00; B62D 29/008; B62D 29/007; B62D 25/04
See application file for complete search history.

(56) References Cited

U.S. PATENT DOCUMENTS 9,193,390 B1 11/2015 Yoshida
10,611,409 B2 4/2020 Tyan et al.
10,633,031 B2 * 4/2020 Marquez Duran .... C21D 1/673
(Continued)

FOREIGN PATENT DOCUMENTS

CN 105873808 A 8/2016
CN 108202764 A 6/2018
(Continued)

*Primary Examiner* — Amy R Weisberg
*Assistant Examiner* — Sara Laghlam
(74) *Attorney, Agent, or Firm* — Holland & Hart LLP

(57) ABSTRACT

A vehicle component for a vehicle has a component body which extends longitudinally in a longitudinal direction, wherein the component body has deformation zones which are spatially distributed in the longitudinal direction and are formed in the component body of sheet metal material. At least two locally distributed and spaced-apart deformation zones have different tensile strengths configured to influence a deformation course of the component body upon a force acting on the component body.

20 Claims, 8 Drawing Sheets

(56) References Cited

U.S. PATENT DOCUMENTS

| | | | | |
|---|---|---|---|---|
| 2002/0101086 A1* | 8/2002 | Koch | ............... | F16F 7/123 |
| | | | | 293/133 |
| 2004/0201256 A1* | 10/2004 | Caliskan | ............... | F16F 7/12 |
| | | | | 296/193.06 |
| 2006/0125291 A1* | 6/2006 | Buravalla | ............... | B62D 25/00 |
| | | | | 296/187.03 |
| 2006/0249342 A1* | 11/2006 | Canot | ............... | B62D 21/152 |
| | | | | 188/377 |
| 2008/0106107 A1* | 5/2008 | Tan | ............... | B60R 19/34 |
| | | | | 293/133 |
| 2009/0026777 A1* | 1/2009 | Schmid | ............... | B60R 19/34 |
| | | | | 293/133 |
| 2010/0066106 A1* | 3/2010 | Nojima | ............... | B60R 19/18 |
| | | | | 293/120 |
| 2010/0201159 A1* | 8/2010 | Chretien | ............... | B62D 21/155 |
| | | | | 296/193.03 |
| 2011/0121587 A1* | 5/2011 | Handing | ............... | B60R 19/34 |
| | | | | 293/133 |
| 2011/0204663 A1* | 8/2011 | Baccouche | ............... | B60R 19/18 |
| | | | | 293/133 |

FOREIGN PATENT DOCUMENTS

| | | |
|---|---|---|
| DE | 10 2014 211 510 A | 12/2015 |
| DE | 10 2016 125 033 B3 | 11/2017 |

* cited by examiner

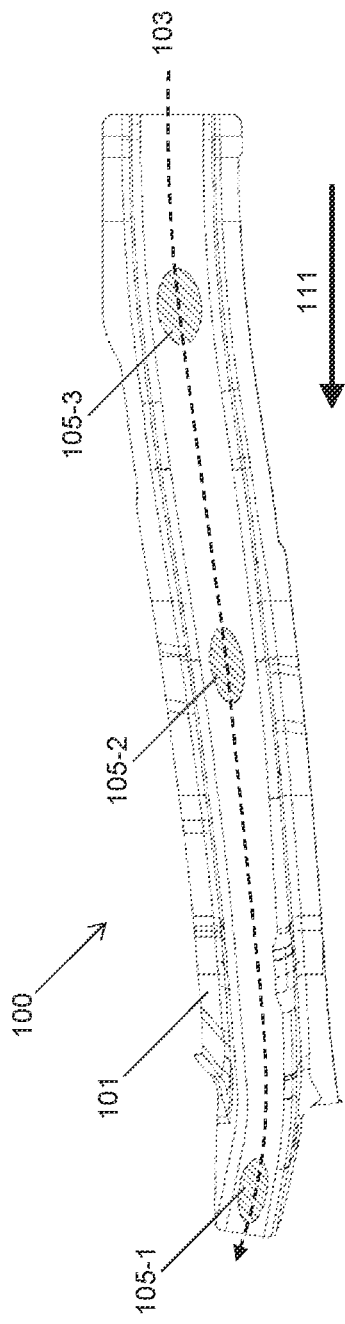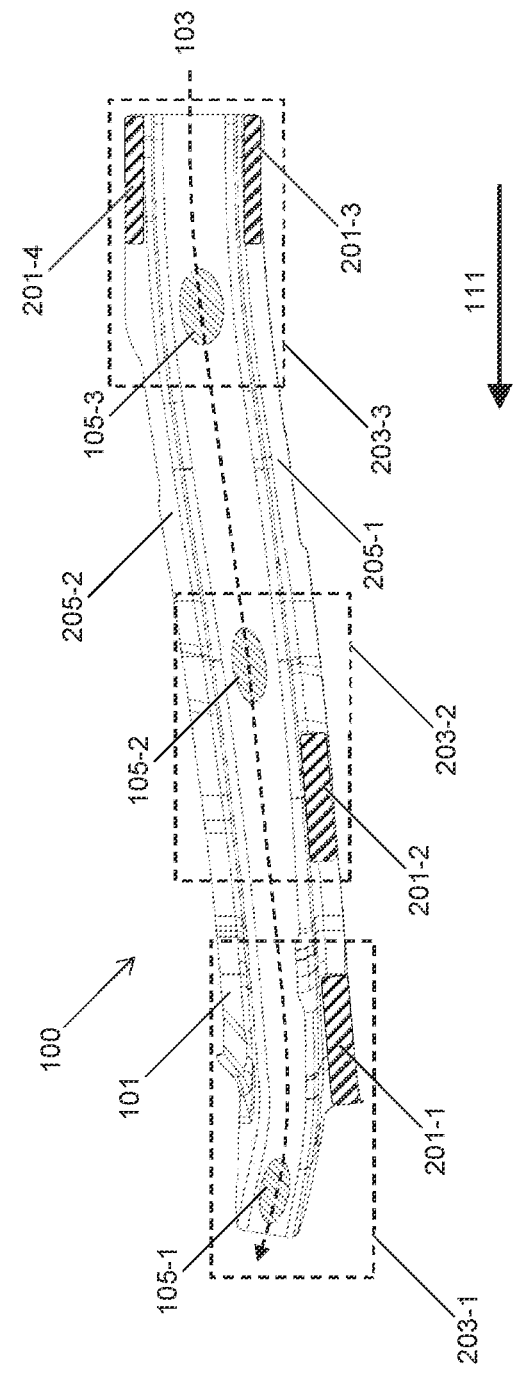
Fig. 2A
Fig. 2B

VEHICLE COMPONENT FOR A VEHICLE

CROSS-REFERENCE

The present application is a continuation of U.S. patent application Ser. No. 16/693,625 by Frost et al., entitled "VEHICLE COMPONENT FOR A VEHICLE," filed Nov. 25, 2019, which claims the benefit of German Patent Application No. 10 2018 129 724.6 by Frost et al., entitled "FAHRZEUGBAUTEIL FÜR EIN FAHRZEUG," filed Nov. 26, 2018, each of which is assigned to the assignee hereof, and each of which is expressly incorporated by reference in its entirety herein.

TECHNICAL FIELD

The present disclosure relates to a vehicle component for a vehicle, in particular for a motor vehicle.

BACKGROUND

The vehicle component may in particular be part of a vehicle body and determine the mechanical properties, for example a deformation of the vehicle body in the event of a force acting on the vehicle body. Furthermore, the vehicle component may have deformation regions which may have a reduced material hardness in order to concentrate a deformation of the vehicle component on these deformation regions. In particular, this allows the direction of the deformation to be controlled and/or cracks in the vehicle component to be avoided. Accordingly, with the deformation regions a change in the geometry of the vehicle component can be predetermined at an acting force. However, with the known vehicle components, the time profile of the deformation or of the energy absorption by the vehicle component in the case of an external force acting on the vehicle component cannot be predetermined.

SUMMARY

It is the object of the present disclosure to provide a more efficient vehicle component, which is in particular adapted to realize a predetermined temporal and/or geometric deformation behavior of the vehicle component when a force is applied to the vehicle component.

This object is solved by the features of the independent claims. Advantageous examples are subject of the dependent claims, the description and the accompanying figures.

The present disclosure is based on the finding that the above object is achieved by a vehicle component having a plurality of localized deformation zones having different material hardnesses in respect to each other and in respect to the surrounding material. In particular, first deformation zones with a low material hardness can be provided at force introduction points of the vehicle component, and with increasing distance from the force introduction points, further deformation zones, which are spaced from the first deformation zone, can have a greater material hardness than the first deformation zones. As a result, the deformation behavior of the vehicle component, in particular an accordion-like folding, a buckling and/or bending and its respective temporal development, can be predetermined.

According to a first aspect, the disclosure relates to a vehicle component for a vehicle, with a component body, which extends longitudinally in a longitudinal direction. The component body has longitudinally distributed and deformation zones, which are spaced apart from each other, which are formed in the component body of sheet material. At least two locally distributed and deformation zones, which are spaced-apart from each other, have different tensile strengths in order to influence a deformation profile of the component body when a force is applied to the component body.

The vehicle component may be a thermoformed vehicle component, in particular made of a hardenable steel alloy, for example manganese-boron steel. For example, an A-pillar, a part of the roof frame, an inner reinforcement of the roof frame, a side rail, an inner reinforcement of the side rail, a fender, a beam, a diagonal strut, a vertical strut, an end wall, a tunnel in a subfloor, a seat cross member, a joist, a heel plate, a side sill, a B-pillar, a C-pillar, a roof cross member, a seat back, seat area and/or a seat edge.

Furthermore, the vehicle component may be a, in particular partially hardened, axle part, wherein the axle part may have predetermined bending points. These predetermined bending points can be realized, for example, by means of the deformation zones or can be formed by the deformation zones.

Furthermore, the vehicle component may be made of steel, in particular a UHSS steel, aluminum, an aluminum alloy or a composite material. The deformation zones can be produced for example by a local heat treatment of the component body. By the heat treatment the transition of the deformation zones to the sheet metal material can be additionally adapted. For example, a gradual, continuous or stepped adaptation of the tensile strength can be realized. The deformation zones can be arranged in a flat surface of the component body and/or can extend over edges, bends and/or recesses of the component body. A shaping of the component body can take place before or after the introduction of the deformation zones.

The deformation zones may in particular be adapted to control a deformation of the component body in the case of a force acting parallel to the longitudinal direction. For example, a multipart folding of the component body can be realized. A temporal and local predetermination of the folding can be realized by an adaptation of the tensile strength of the deformation zones. Deformation zones with a lower tensile strength can allow a deformation of the component body before deformation zones with a higher tensile strength allow a further deformation of the component body.

Furthermore, the deformation zones can be arranged at the expected force application points in order to realize a force absorption and correspondingly a deformation in a deformation zone, wherein regions of the component body outside the deformation zone experience less or no deformation. Deformation zones with increasing tensile strength can be arranged along the longitudinal direction.

Furthermore, a plurality of mutually separated deformation zones of the same or similar tensile strength can be arranged in a first section of the component body. Moreover, in a second section, which is offset along the longitudinal direction relative to the first section, further deformation zones, which are separated from each other, of the same or similar tensile strength can be arranged. The tensile strength of the further deformation zones in the second section may be greater than the tensile strength of the deformation zones in the first section. The deformation zones in the respective section can be arranged centrally or partially spaced from an axis of symmetry of the component body.

The component body extends axially along the longitudinal direction, wherein the longitudinal direction may have a curved course, which follows the geometry of the component body. Furthermore, the longitudinal direction can coincide with an axis of symmetry and/or a main extension direction of the component body.

In one example, the component body with the locally distributed deformation zones can be formed in one piece, in particular in one piece and without interruption, from the sheet metal material. As a result, the advantage is achieved that the component body can have gap-free transitions between the deformation zones and the sheet metal material and/or a connection of the deformation zones with the component body by adhesive, welding or screw connections can be dispensed. Furthermore, the component body may have a homogeneous surface and/or a homogeneous surface structure. Furthermore, this can realize the advantage of efficient power transmission from the sheet material to the deformation zones.

In one example, the component body is formed with the locally distributed deformation zones of at least two mutually joined sheet metal blanks. The component body may in particular be a tailored blank or be formed from a tailored blank, and be composed accordingly of sheet metal blanks, which may have different material qualities, sheet thicknesses and/or materials. Furthermore, the joined sheet metal blanks may have overlapping areas in which the sheet metal blanks are arranged overlapping, in particular joined. Furthermore, a reinforcing plate can be arranged at the joining regions or a reinforcing plate can be formed by the joining region.

In one example, each of the locally distributed deformation zones each have a tensile strength, which differs from a tensile strength of the component body outside of the respective locally distributed deformation zone. In particular, the tensile strength outside of the deformation zones can be increased compared to the tensile strength of the deformation zones. As a result, a deformation of the component body may be limited to the deformation zones and/or to areas adjacent to the deformation zones. The sheet material can accordingly undergo a smaller deformation than the deformation zones when a force is applied to the component body.

In one example, the tensile strengths of at least two successive spatially distributed deformation zones, in particular in the longitudinal direction of the component body, are decreasing or increasing. When a force is applied to the component body, first deformation zones of lower tensile strength may first cause a deformation. If the deformation potential of the first deformation zones is exhausted, a second deformation zone with a higher tensile strength than the first deformation zone can result in a further deformation. Accordingly, a temporal sequence of a deformation of the component body by means of the deformation zones of different tensile strength can be controlled.

In one example, a region of higher tensile strength may extend between the first deformation zone and the second deformation zone, wherein the tensile strength is increased, in particular, relative to a respective tensile strength of the first deformation zone and the second deformation zone. As a result, the advantage of improved rigidity properties and advantageously increased resistance to deformation of the component body is achieved.

In one example, deformation zones may have a reduced tensile strength at the ends of the component body in the longitudinal direction and/or further deformation zones that are arranged away from the ends of the component body may have increased tensile strength. Correspondingly, upon a force acting on the component body, first a deformation at the ends of the component body and then a deformation away from the ends of the component body can be realized.

In one example, the deformation zones are arranged with lower tensile strength at expected force application points of the component body and/or deformation zones with higher tensile strength are arranged farther away from the expected force introduction points.

In one example, the tensile strengths of adjacent locally distributed deformation zones are different or the tensile strengths of the locally distributed deformation zones differ by at least 20 MPa, preferably by at least 50 MPa, in particular by at least 100 MPa. The component body can be made of a high-strength steel (UHSS—Ultra High Strength Steel) and have a tensile strength greater than 1350 MPa. Furthermore, the tensile strength of the component body can be less than 2100 MPa. The deformation zones may have a tensile strength which is less than 1100 MPa. Advantageously, the tensile strengths of the locally distributed deformation zones may differ from one another by at least 20 MPa when the component body made of aluminum or an aluminum alloy is manufactured.

The component body may be made of aluminum or an aluminum alloy and have a tensile strength greater than 350 MPa at a yield strength of 0.2% ($R_p0.2$). Furthermore, the tensile strength of the component body may be less than 600 MPa. The deformation zones may have a tensile strength which is less than 400 MPa, wherein the yield strength $R_p0,2$ and/or the tensile strength $R_m$ of the deformation zones may be different from each other and the difference is at least 20 MPa. The component body may in particular be formed from a sheet metal material, which is a flat extruded profile. The flat extruded profile can have different wall thicknesses.

In one example, the component body has a force absorption area for the acting force. A first deformation zone downstream of the force absorption area has a tensile strength which is less than a tensile strength of a second deformation zone downstream of the force absorption area and the first deformation zone in the longitudinal direction.

In one example, the locally distributed deformation zones are formed, in particular in the case of an impact, to obtain a longitudinally predetermined deformation course, in particular a bend or a fold, of the component body. With the reduced tensile strength of the deformation zones, a preferred direction of a folding and/or bending of the component body can be determined. Furthermore, a maximum bending angle of the component body at the deformation zone can be determined by the tensile strength. The greater the tensile strength of the deformation zone, the smaller a maximum achievable bending angle of the deformation zone can be.

The deformation zone can be adapted to realize a predetermined bending direction and/or a predetermined folding arrangement of the component body under a dynamically acting load. For each predetermined folding of the component body, a separate deformation zone may be provided. A temporal order of the folds can be realized by increasing tensile strengths of the deformation zones. For example, deformation zones with a greater tensile strength than deformation zones with a low tensile strength can realize a folding of the component body in a temporally subordinate manner. Accordingly, deformation zones with lower tensile strength can give way first in a collision.

In one example, the locally distributed deformation zones are spaced from each other, in particular by a predetermined distance, or are isolated by sheet material of different tensile strength. In particular, the sheet material may have a higher or different tensile strength relative to the deformation zones.

As a result, the advantage is achieved that the deformation zones do not reduce the stability of the component body, in particular in the case of static or, compared to an impact, a smaller dynamic load. Furthermore, dimensionally stable regions can be formed between the deformation zones by a spaced arrangement of the deformation zones, which, in the event of an impact, do not deform or only slightly deform in comparison to the deformation zones. The combination of dimensionally stable regions and deformation zones can be used to control a defined deformation of the component body in the event of an impact in order to allow for a high degree of energy reduction. For example, in the event of an impact, an accordion-like compression of the component body in the impact direction and/or the longitudinal direction can be realized reproducibly.

In one example, each of the locally distributed deformation zone is enclosed by sheet material of the component body having a tensile strength different from the tensile strength of the respective locally distributed deformation zone, or the locally distributed deformation zones are distributed island-like.

In one example, the different tensile strengths of the locally distributed deformation zones are caused by different material hardnesses of the locally distributed deformation zones. A change in material hardness can be realized by heat, mechanical deformation, chemical processes or structural changes, such as material recesses. The tensile strength of the deformation zones may be proportional to the material hardness of the deformation zones.

In one example, the component body with the locally distributed deformation zones is manufactured by thermoforming, which also known as press hardening.

In one example, the component body with the locally distributed deformation zones is integrally formed from the same sheet metal material, in particular from a metal or a metal alloy.

In one example, the tensile strengths of the locally distributed deformation zones in steel as the sheet material are less than 1100 MPa and in aluminum as the sheet material are in a tensile strength range between 50 MPa and 400 MPa.

In one example, outside of the locally distributed deformation zones, the component body has an increased tensile strength of at least 5%, preferably at least 10%, in particular at least 15%, with respect to the locally distributed deformation zones.

In one example, the locally distributed deformation zones form zone groups of deformation zones of equal tensile strength. For example, a first number of spaced-apart deformation zones having a first tensile strength can be arranged in a first region of the component body. In a second region of the component body, a second number of spaced apart deformation zones having a second tensile strength and/or in a third region of the component body a third number of spaced deformation zones having a third tensile strength may be arranged. The tensile strength of the first number may be smaller than the tensile strength of the second number and/or the tensile strength of the second number may be smaller than the tensile strength of the third number. Further, the tensile strength of the third number may be smaller than the tensile strength of the surrounding sheet material.

In one example, the deformation zone with the lowest tensile strength has the greatest distance to an interior and/or a survival cell of the motor vehicle when viewing the component body in a mounted state in the motor vehicle.

In one example, the locally distributed deformation zones are free of edges or at least partially oval, circular, triangular, rectangular. Furthermore, the deformation zones can each correspond to any desired free form, which can be adapted to the geometry of the component body. In particular, the deformation zones can be arranged in planar regions of the component body. An edge contour of the deformation zone can in particular have a continuous curvature, so that the deformation zone can be edge-free.

In one example, the tensile strengths of the locally distributed deformation zones are lower relative to the surrounding sheet material of the component body.

In one example, the component body additionally has further locally distributed deformation zones transversely to the longitudinal direction. In particular, the deformation zones arranged transversely to the longitudinal direction may have the same characteristics as the deformation zones arranged in the longitudinal direction.

In one example, the vehicle component is a vehicle pillar, in particular an A, B, or C pillar, a carrier, in particular a side rail or a cross rail, a bumper, or a body component.

According to a second aspect, the disclosure relates to a method for producing a vehicle component for a vehicle, with forming, in particular thermoforming, of a semi-finished product to form a component body which extends longitudinally in a longitudinal direction; and applying heat to the component body to produce longitudinally distributed deformation zones, which are formed of sheet material in the component body, wherein at least two locally distributed deformation zones, which are spaced-apart from each other, of different tensile strengths are generated after the forming, to influence a deformation course of the component body upon a force acting on the component body. In particular, the deformation zones may have different material hardnesses relative to the surrounding sheet metal material and/or relative to each other.

Due to the heat application of the component body, the hardness and strength can be reduced locally after a hardening of the component body or on a cold-formed sheet metal plate made of UHSS. The cold-formed sheet metal blank can be formed into a semi-finished product which can form the component body. The heat application can be implemented inductively, by means of a laser, a burner and/or a, in particular contour-matched heating plate.

In one example, prior to the heat-forming of the component body, the sheet metal blank or the preformed semi-finished product can be heated to austenitizing temperature in a partial area and then quenched in a cooled pressing tool. This can also be called "multi-zone heating". The component body can be adapted to be austenic on reaching the austenitizing temperature and to take carbon almost completely into solution.

In one example, the sheet metal blank or the preformed semi-finished product may first be completely austenitized prior to form hardening, then cooled or held in a partial region to a temperature between austenitizing temperature and martensite start temperature, and finally quenched in the cooled pressing tool. This can also be referred to as "multi-zone cooling".

In particular, the deformation zones can be softened by means of a heat treatment of an already hardened component body. The component body can be formed from a combination of materials comprising martensite, retained austenite, perlite, ferrite and/or bainite. The material hardness of the component body may be dependent on a martensite proportion. The deformation zones in the component body can be produced by a partial austenitization of the component body, in particular with subsequent ferrite-pearlite conversion. A softening of the deformation zones achieves the advantage of better formability. Alternatively, tempering may be performed at a temperature less than a recrystallization temperature Ac3.

Furthermore, the softening of the deformation zones may be realized by recrystallization of the component body, which is in particular formed by a thin sheet. The grain structure of the material can be completely renewed by brief heating to allow further cold forming.

In one example, the component body is formed from a cold-hardened 5000 aluminum alloy, and after reshaping the component body, the component body can be heat-treated in a partial region by means of induction, laser, burner and/or heating plate to produce the deformation zones. A subsequent heat treatment of the surrounding high-strength areas can be omitted. Furthermore, the surrounding high-strength areas can be additionally cooled in order to reduce a heat flow. Accordingly, heat input can be restricted to a limited area. This may be necessary for deformation zones with low tensile strength, since they can experience an increased heat input.

In one example, the component body is formed of a work hardened 5000 or precipitation hardenable 6000 or 7000 aluminum alloy, and prior to forming the component body, the component body may be heat treated by induction, laser, torch and/or heating plate in a portion to create the deformation zones. The heat treatment can be varied in duration and/or intensity, wherein a change in the tensile strength can be proportional to an energy input into the deformation zone. After the heat treatment, a cooling of the deformation zones and/or the semi-finished product can be realized by means of an active cooling, in particular the semi-finished product can be quenched. Subsequently, the semi-finished product can be formed by means of a cold pressing tool to the component body. Forming may take place immediately after the heat treatment and/or cooling. For a 5000 alloy, reshaping may be necessary immediately after the heat treatment.

In one example, the vehicle component is a side member or a fender in a front end and/or a rear portion of a vehicle, wherein the deformation zones are adapted during an impact, to controllably compress and/or buckle the vehicle component.

In one example, the vehicle component is a deformation element in the front end and/or the rear end of the vehicle, wherein the deformation element is arranged in a main load path, in an upper load path and/or a lower load path of the vehicle, and wherein the deformation zones are adapted during an impact to controllably compress and/or buckle the vehicle component.

In one example, the vehicle component is a beam in the front end and/or rear end of the vehicle, the deformation zones being formed to controllably twist and/or bend the wearer during impact.

In one example, the vehicle component is a diagonal strut in the front end of the vehicle, wherein the deformation zones are formed with a small overlap to bend the diagonal strut in a controlled manner during impact.

In one example, the vehicle component is a vertical strut in the front end of the vehicle, wherein the deformation zones are formed to controllably compress the vertical strut during impact.

In one example, the vehicle component is an end wall in the front of the vehicle, wherein the deformation zones are formed in an impact to compress the end wall in a controlled manner.

In one example, the vehicle component is a tunnel, a seat cross member, a longitudinally arranged joist and/or a heel plate, which are respectively arranged in an underbody of the vehicle, wherein the deformation zones are formed to controllably compress the vehicle component during impact.

In one example, the vehicle component is arranged laterally to the left or to the right or at the roof of the vehicle, wherein the vehicle component forms an A pillar, a B pillar, a C pillar, a roof cross member and/or a roof frame, and wherein the deformation zones are formed at an impact, to controllably buckle and/or to provide expansion reserves of stiffness jumps of the vehicle component.

In one example, the vehicle component is arranged on the left or right side, in particular in a door of the vehicle, wherein the vehicle component is a door impact carrier and the deformation zones are formed during impact to bend the door impact carrier in a controlled manner. The controlled buckling of the door impact beam can be realized in particular while maintaining the structural integrity of the door impact beam and a reduction, in particular a minimization, a maximum penetration depth of the door impact beam may be realized.

In one example, the vehicle component is arranged in the interior of the vehicle, in particular as part of a vehicle seat, wherein the vehicle component is a backrest, a flank and/or a seat surface, and wherein the deformation zones are formed during impact to controllably compress and to buckle the vehicle component to prevent uncontrolled collapse of the vehicle component.

In a controlled buckling of the vehicle component deformation zones with lower tensile strength can be arranged closer to force application points as deformation zones with greater tensile strength. In a controlled buckling, an accordion-like folding of the vehicle component can be realized by an alternating arrangement of areas of lower tensile strength and areas with greater tensile strength.

In one example, the deformation zones form a predetermined bending point in order to prevent buckling of regions of the vehicle component that are vulnerable to buckling outside of the deformation zones.

Furthermore, the advantage can be achieved by the arrangement of deformation zones of different tensile strength in the component body, that the asymmetric geometries of the component body can be balanced and/or compensated.

A controlled deformation can be defined as a predetermined geometric influence, in particular with a predetermined deformation direction and/or a predetermined temporal sequence. A controlled compression, buckling, bending, twisting and/or folding achieves the advantage that an uncontrollable collapse of the vehicle component can be prevented.

BRIEF DESCRIPTION OF THE DRAWINGS

Further examples will be explained with reference to the accompanying figures.

FIG. 2A shows a vehicle component in one example;
FIG. 2B shows a vehicle component in one example.

DETAILED DESCRIPTION

Figures 1A, 1B:
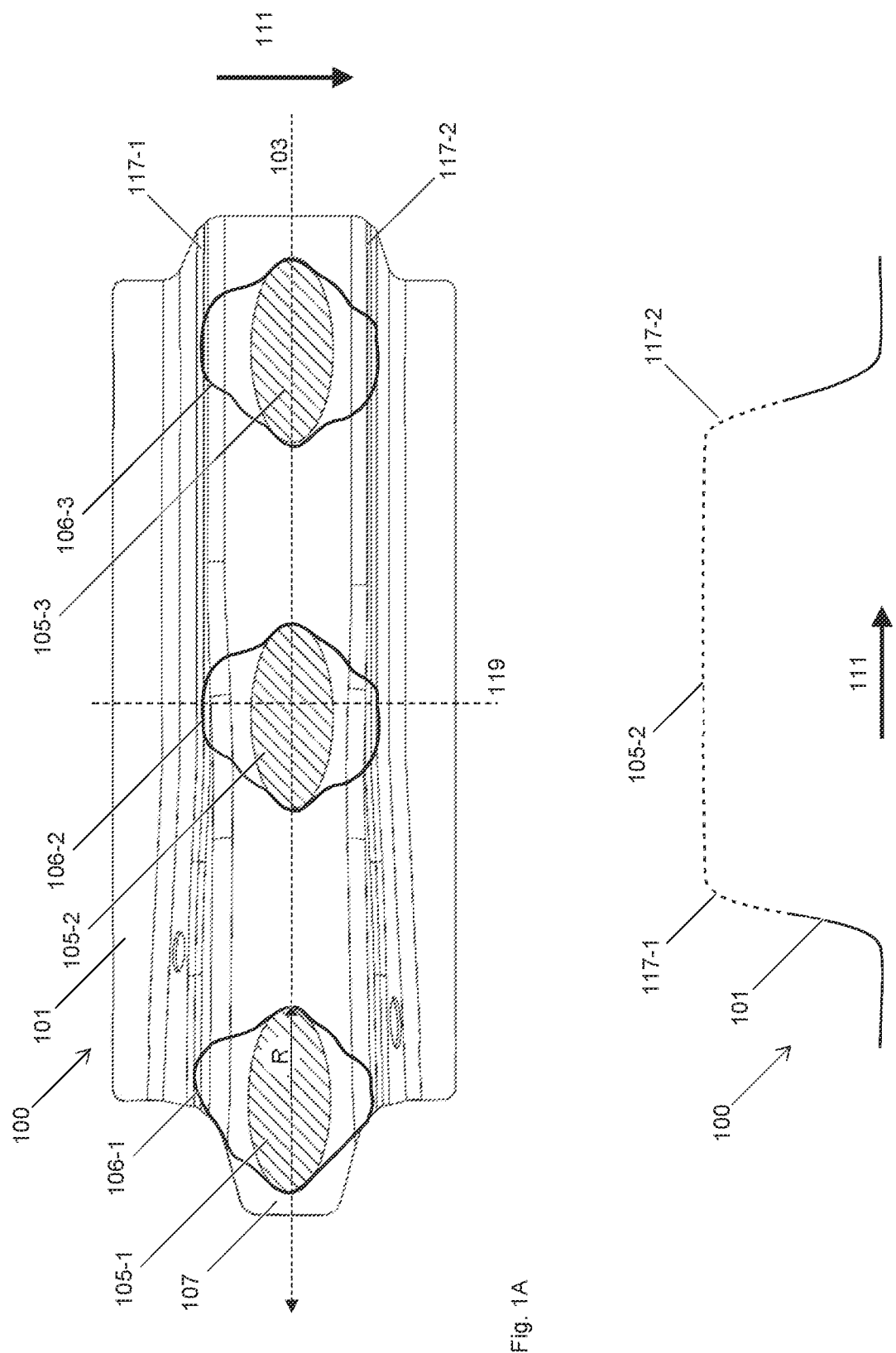
FIG. 1A shows a vehicle component in one example.
FIG. 1B shows a vehicle component in one example.

FIG. 1A shows a schematic representation of a vehicle component 100 with a component body 101, which extends in a longitudinal direction 103 longitudinally. The component body 101 has in the longitudinal direction 103 locally distributed deformation zones 105-1, 105-2, 105-3, which are formed in the component body 101 of sheet material. At least two locally distributed and spaced-apart deformation zones 105-1, 105-2, 105-3 have different tensile strengths in order to influence a deformation course of the component body 101 when a force is applied to the component body 101. The vehicle component 100 is a seat cross member, which can be arranged in an underbody of a vehicle.

The component body 101 is integrally and uninterrupted formed with the locally distributed deformation zones 105-1, 105-2, 105-3 from the sheet material. Further, each of the locally distributed deformation zones 105-1, 105-2, 105-3 has a tensile strength different from a tensile strength of the component body 101 outside the respective locally distributed deformation zone 105-1, 105-2, 105-3. The tensile strength outside the deformation zones 105-1, 105-2, 105-3 is in particular greater than the respective tensile strength of the deformation zones 105-1, 105-2, 105-3. Furthermore, the tensile strengths differ from the adjacent locally distributed deformation zones 105-1, 105-2, 105-3, in particular the tensile strengths differ by at least 50 MPa, preferably 100 MPa. A first deformation zone 105-1 may have a material hardness of 500 HV, a second deformation zone 105-2 may have a material hardness of 650 HV, and a third deformation zone 105-3 may have a material hardness of 500 HV. The deformation zones 105-1 through 105-3 may extend beyond an upper radius R, as shown by deformation zone boundaries 106-1 through 106-3. The deformation zone boundaries 106-1 to 106-3 describe the transition of the respective deformation zone 105-1 to 105-3 to the material of the component body 101 surrounding the deformation zones 105-1 to 105-3.

The component body 101 has a force-receiving region 107 for the application of force, wherein a first deformation zone 105-1 arranged downstream of the force-receiving region 107 has a tensile strength which is lower than a tensile strength of a second deformation zone 105-2 downstream of the force-receiving region 107 and the first deformation zone 105-1 in the longitudinal direction 103. Furthermore, the locally distributed deformation zones 105-1, 105-2, 105-3 are formed, in order to obtain, in the event of an impact, a predetermined deformation course in the longitudinal direction 103 of the component body 101, in particular a bend or a fold. The locally distributed deformation zones 105-1, 105-2, 105-3 are spaced apart from each other at a predetermined distance and insulated by sheet material. The sheet material has a higher tensile strength compared to the deformation zones 105-1, 105-2, 105-3. The locally distributed deformation zones 105-1, 105-2, 105-3 are formed oval and edge-free.

The vehicle component 100 may be arranged in a vehicle, in particular transversely to a direction of travel 111. Furthermore, the vehicle component 100 may be formed symmetrically transversely to the direction of travel 111, wherein the first deformation zone 105-1 and the third deformation zone 105-3 have a similar tensile strength, which is further reduced with respect to the second deformation zone 105-2. Accordingly, the vehicle component 100 may be designed to be deformed first in the regions of the first deformation zone 105-1 and the third deformation zone 105-3 in the event of a collision of the vehicle, and subsequently to be deformed in the region of the second deformation zone 105-2. The force acting on the vehicle component 100 is, for example, parallel to the direction of travel 111. Further, the component body 101 has two curved portions 117-1, 117-2, which are formed in the longitudinal direction 103, and formed to form a U-profile shape of the component body 100.

FIG. 1B shows a schematic cross-sectional view of a vehicle component 100 according to the example shown in FIG. 1A. The cross-sectional view corresponds to a cross-section of the component body 100 along the cross-sectional axis 119 shown in FIG. 1A. The cut deformation zone 105-2 extends along the profile shape of the component body 100, in particular along the curvature regions 117-1, 117-2.

Figure 1C:
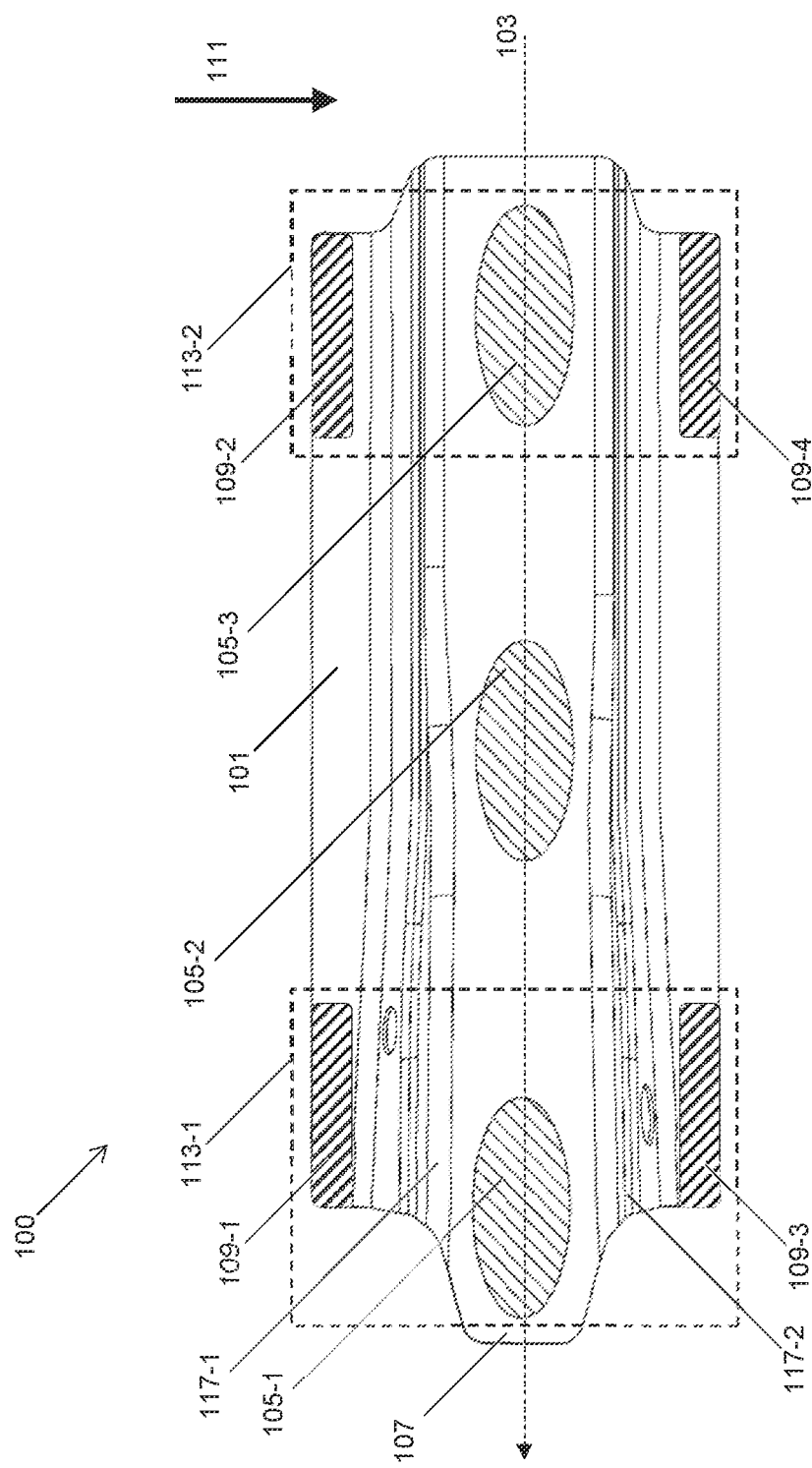
FIG. 1C shows a vehicle component in one example.

FIG. 1C shows a schematic representation of a vehicle component 100 which is a seat cross member, which may be arranged in a underbody of a vehicle. The vehicle component 100 corresponds to the example shown in FIG. 1A, wherein four further deformation zones 109-1 to 109-4 are formed in the component body 101. The further deformation zones 109-1 to 109-4 are rectangular, in particular formed with rounded corners.

The locally distributed deformation zones 105-1, 105-3, 109-1, 109-2, 109-3, 109-4 form zone groups 113-1, 113-2 of deformation zones of the same tensile strength. A first zone group 113-1 includes the deformation zones 105-1, 109-1, and 109-3. A second zone group 113-2 includes the deformation zones 105-3, 109-2 and 109-4.

In one example, the deformation zones 109-1 and/or 109-3 may each have a lower tensile strength than the deformation zone 105-1.

Figure 1D:
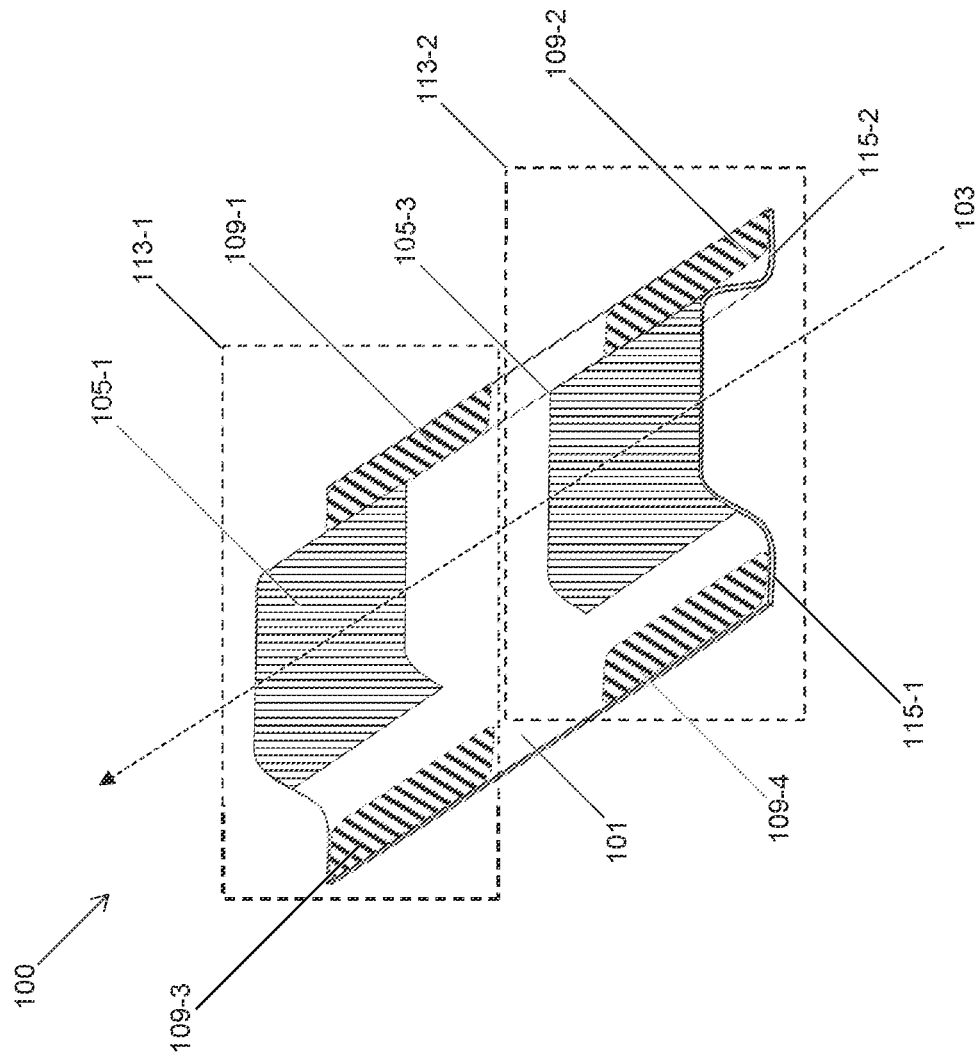
FIG. 1D shows a vehicle component in one example.

FIG. 1D shows a schematic perspective illustration of a vehicle component 100 with a component body 101, which extends in a longitudinal direction 103 longitudinally. The component body 101 has in the longitudinal direction 103 locally distributed deformation zones 105-1, 105-3, which are formed in the component body 101 of sheet material. The vehicle component 100 is a seat cross member, which may be disposed in an underbody of a vehicle.

In one example, the deformation zones 105-1, 105-3 may have comparable tensile strength. The vehicle component 100 has a U-profile shape, wherein at the profile ends in each case a flattened sideband 115-1, 115-2 is formed, on which the further deformation zones 109-1, 109-2 and 109-3, 109-4 are arranged, respectively. The further deformation zones 109-1 to 109-4 may have a lower tensile strength with respect to the deformation zones 105-1, 105-3.

The component body 101 has two curved regions 117-1, 117-2, which are formed in the longitudinal direction 103, and in particular each adjacent to a flattened sideband 115-1, 115-2. The deformation zones 105-1, 105-3 extend beyond a plateau region of the U-profile shape into the respective curved region 117-1, 117-2 of the component body 101. Correspondingly, the deformation zones 105-1, 105-3 can also have a U-profile shape exhibit.

The locally distributed deformation zones 105-1, 105-3, 109-1, 109-2, 109-3, 109-4 form zone groups 113-1, 113-2 of deformation zones of different tensile strength. A first zone group 113-1 includes the deformation zones 105-1, 109-1, and 109-3. A second zone group 113-2 includes the deformation zones 105-3, 109-2 and 109-4.

FIG. 2A shows a schematic illustration of a vehicle component 100 having a component body 101 which extends in a longitudinal direction 103 longitudinally. The component body 101 has in the longitudinal direction 103 locally distributed deformation zones 105-1, 105-2, 105-3, which are formed in the component body 101 of sheet material. At least two locally distributed and spaced-apart deformation zones 105-1, 105-2, 105-3 have different tensile strengths in order to influence a deformation course of the component body 101 when a force is applied to the component body 101. The vehicle component 100 is a side rail, which may be arranged in a front end of a vehicle.

The tensile strengths of three successive locally distributed deformation zones 105-1, 105-2, 105-3 in the longitudinal direction 103 of the component body 101 are decreasing. The component body 101 additionally has transversely to the longitudinal direction 103 further locally distributed deformation zones 109-1, 109-2, 109-3, 109-4.

Each of the locally distributed deformation zones 105-1, 105-2, 105-3 is enclosed by sheet material of the component body 101 having a tensile strength different from the tensile strength of the respective locally distributed deformation zone 105-1, 105-2, 105-3. Furthermore, the locally distributed deformation zones 105-1, 105-2, 105-3 are arranged island-like.

The tensile strengths of the locally distributed deformation zones 105-1, 105-2, 105-3 differ from a tensile strength of the sheet metal material of the component body 101 surrounding the locally distributed deformation zones 105-1, 105-2, 105-3.

FIG. 2B shows a schematic illustration of a vehicle component 100 that has a longitudinal member that can be arranged in a front end of a vehicle. The vehicle component 100 corresponds to the example shown in FIG. 2A, wherein four further deformation zones 201-1, 201-2, 201-3, 201-4 are formed in the component body 101. The further deformation zones 201-1, 201-2, 201-3, 201-4 are rectangular, in particular formed with rounded corners.

In one example, the component body 101 may be aligned in the direction of travel 111 of the vehicle. Furthermore, the material hardness of the deformation zones 105-1 to 105-3 and 201-1 to 201-4 may decrease in the direction of travel 111 in order to effect an accordion-like folding of the component body 101 and/or a force absorption at introduction points in the event of an impact.

In one example, the deformation zones 105-1, 201-1 may have a first tensile strength and/or the deformation zones 105-2, 201-2 may have a second tensile strength and/or the deformation zones 105-3, 201-3, 201-3 may have a third tensile strength.

The component body 101 has a U-profile shape, wherein in each case a flattened sideband 205-1, 205-2 is formed on respective legs of the U, on which the deformation zones 201-1, 201-2, 201-3 and 201-4 are arranged.

The locally distributed deformation zones 105-1 to 105-3 and 201-1 to 201-4 form zone groups 203-1, 203-2, 203-3 of deformation zones of different tensile strength. A first zone group 203-1 includes the deformation zones 105-1 and 201-1. A second zone group 203-2 includes the deformation zones 105-2 and 201-2, and a third zone group 203-3 includes the deformation zones 201-3, 201-4.

Figure 2C:
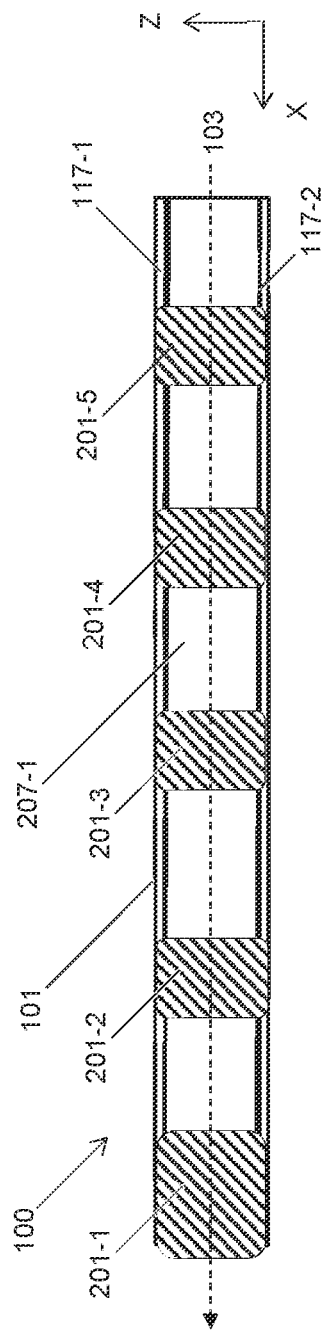
FIG. 2C shows a vehicle component in one example.

FIG. 2C shows a schematic representation of a vehicle component 100 having a component body 101 which extends in a longitudinal direction 103 longitudinally. The component body 101 has in the longitudinal direction 103 locally distributed deformation zones 201-1, 201-2, 201-3, 201-4, 201-5, which are formed in the component body 101. At least two locally distributed and spaced-apart deformation zones 201-1 to 201-5 have different tensile strengths in order to influence a deformation profile of the component body 101 when a force is applied to the component body 101. The component body 101 has a rectangular shape and comprises a first side surface 207-1, wherein the deformation zones 201-1 to 201-5 are arranged at least on the second side surface 207-2.

The deformation zones 201-2 to 201-5 may have a comparable surface area, the first deformation zone 201-1 having a larger surface area in relation to the further deformation zones 201-2 to 201-5, in particular having twice the surface area on the first side surface 207-1. The deformation zones 201-1 to 201-5 extend transversely to the longitudinal direction 103 completely over the first side face 207-1, in particular also beyond the adjacent side faces which are not visible in the illustration shown. The longitudinal direction 103 of the component body 101 extends parallel to an indicated X-axis and the first side surface 207-1 is arranged parallel to an X-Z plane.

Figure 2D:
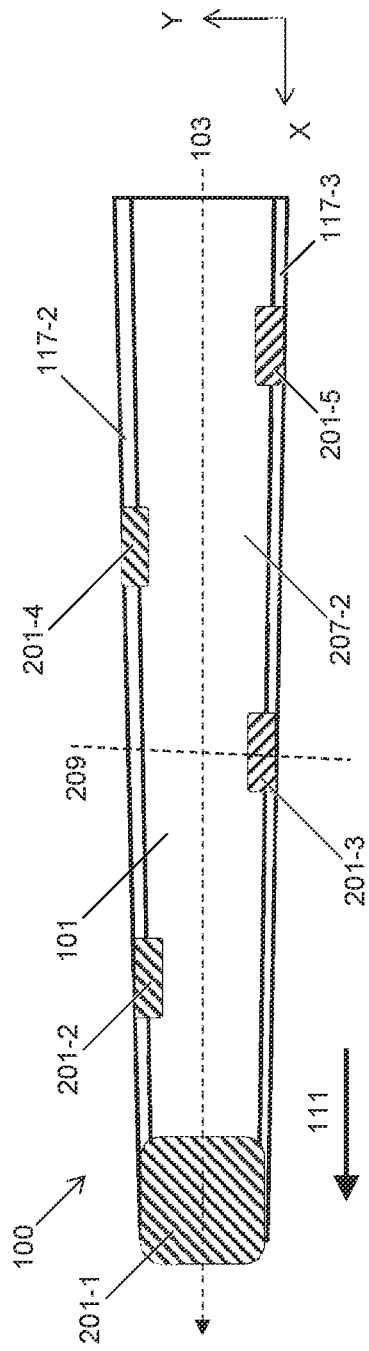
FIG. 2D shows a vehicle component in one example.

FIG. 2D shows a schematic representation of a vehicle component 100 according to the example shown in FIG. 2C. With reference to the illustration of FIG. 2C, the illustration shown in FIG. 2D is rotated by 90° with the X axis as the axis of rotation.

The component body 101 comprises a second side surface 207-2, which is arranged adjacent and at an angle, in particular at a 90° angle, to the first side surface 207-1. The deformation zones 201-2 to 201-5 extend transversely to the longitudinal direction 103 at least partially on the second side surface 207-2. The first deformation zone 201-1 extends completely across the second side surface 207-2 transversely to the longitudinal direction 103. In particular, the first deformation zone 207-1 extends over all side surfaces of the component body 101.

Furthermore, the component body has a further curvature region 117-3, wherein the second side surface 207-2 is bounded laterally by the curvature regions 117-2 and 117-3. The deformation zones 201-2, 201-4 extend over the curvature area 117-2, and the deformation zones 201-3, 201-5 extend over the curvature area 117-3. The longitudinal direction 103 of the component body 101 extends parallel to an indicated X axis and the second side surface 207-2 is arranged parallel to an X-Y plane.

Figure 2F:
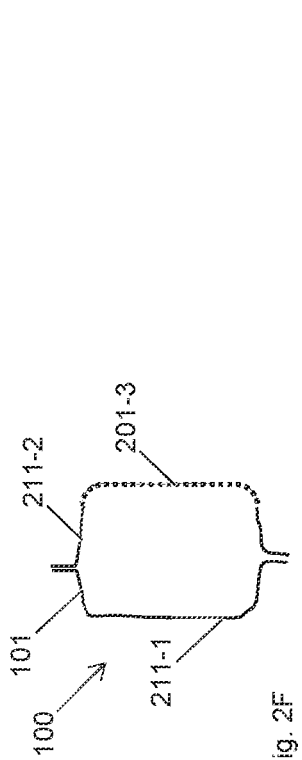
FIG. 2F shows a vehicle component in one example.
Figure 2E:
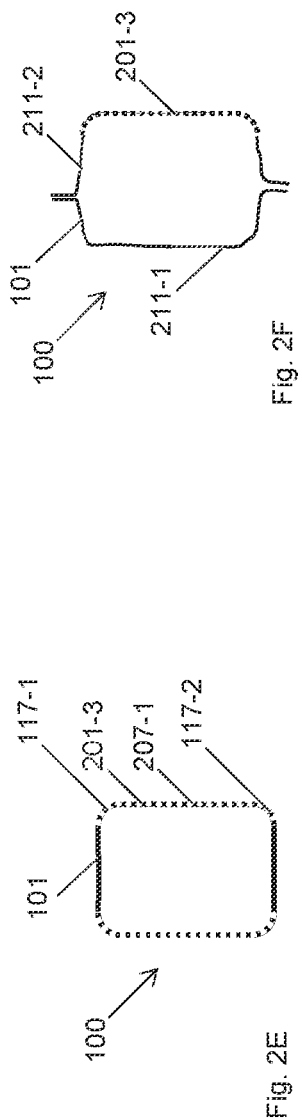
FIG. 2E shows a vehicle component in one example.

FIG. 2E shows a schematic cross-sectional view of a vehicle component 100 according to the example shown in FIG. 2D. The cross-sectional view corresponds to a cross section of the component body 100 along the cross-sectional axis 209 shown in FIG. 2D. The cut deformation zone 201-3 extends along the profile shape of the component body 100, in particular along the side surface 207-1 and the curved regions 117-1, 117-2, The component body 101 is formed from a one-piece hollow profile.

FIG. 2F shows a schematic cross-sectional view of a vehicle component 100 according to the example shown in FIG. 2D. The cross-sectional view corresponds to a cross-section of the component body 100 along the cross-sectional axis 209 shown in FIG. 2D. The cut deformation zone 201-3 extends along the profile shape of the component body 100. The component body 101 has two longitudinal members 211-1, 211-2 which are mutually connected are connected so that the component body 101 is formed double-shelled.

Figure 3B:
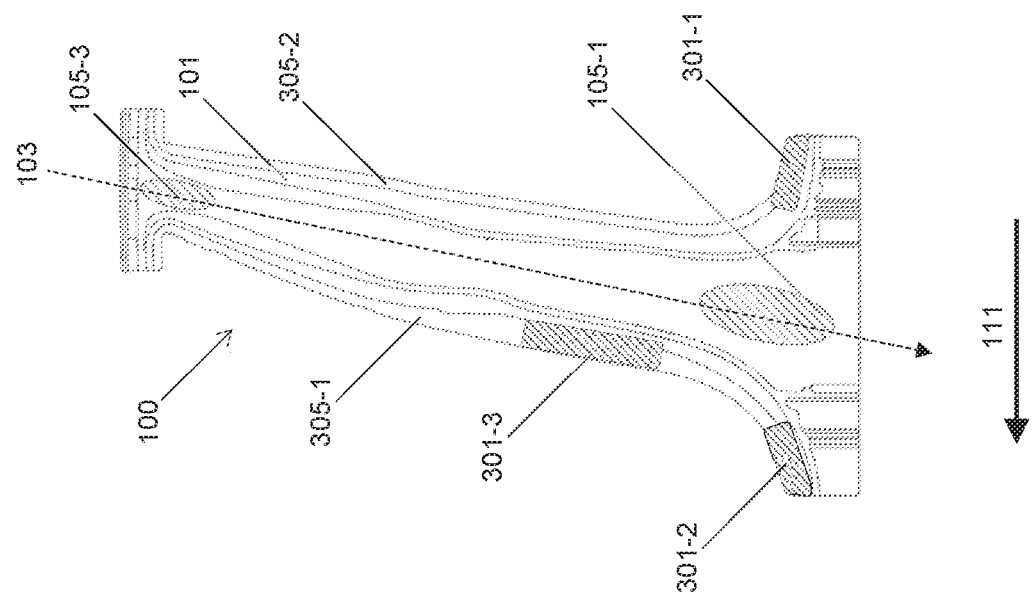
FIG. 3B shows a vehicle component in one example.
Figure 3A:
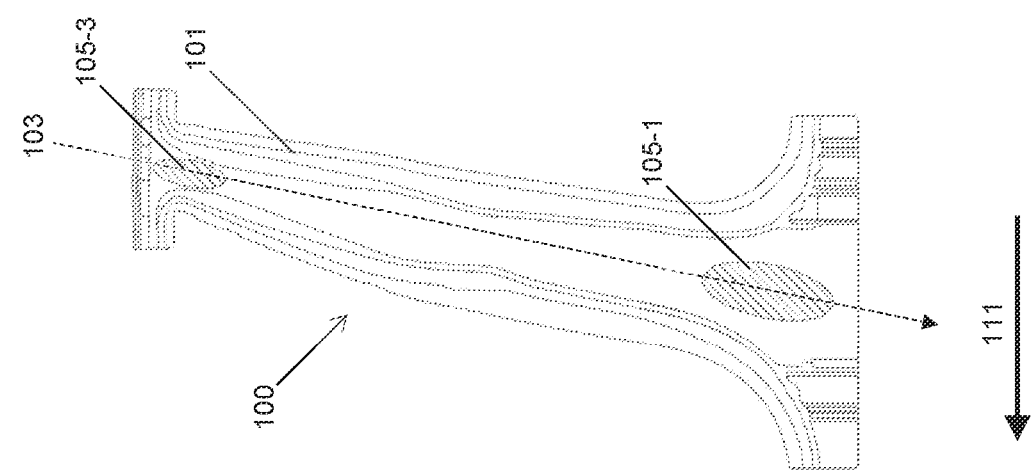
FIG. 3A shows a vehicle component in one example.

FIG. 3A shows a schematic illustration of a vehicle component 100 having a component body 101 which extends in a longitudinal direction 103 longitudinally. The component body 101 has in the longitudinal direction 103 locally distributed deformation zones 105-1, 105-3, which are formed in the component body 101 of sheet material. At least two locally distributed and spaced-apart deformation zones 105-1, 105-3 have different tensile strengths in order to influence a deformation course of the component body 101 when a force is applied to the component body 101. The vehicle component 100 is a B-pillar, which can be arranged laterally and/or on a roof of a vehicle. The vehicle component 100 is arranged transversely to the direction of travel 111 along the longitudinal direction 103.

Further, the deformation zones 105-1, 105-3 are, for example, oval-shaped, and a respective area of the deformation zones 105-1, 105-3 increases in the lengthwise direction 103, and the tensile strength of the deformation zones 105-1, 105-3 decreases in the longitudinal direction 103. A first deformation zone 105-1 may have a tensile strength of 500 to 600 MPa, a second deformation zone 105-3 may have a tensile strength of 650 to 700 MPa.

The vehicle component 100 may be connected to a vehicle floor in a region of the first deformation zone 105-1 and/or to a vehicle roof in the region of the third deformation zone 105-3. Accordingly, in the event of an impact, the vehicle component 100 may bend in a controlled manner from the bottom upwards or from the first deformation zone 105-1 to the third deformation zone 105-3, and a force absorption at introduction points, for example in the area of the first deformation zone 105-1, can be realized.

FIG. 3B shows a schematic representation of a vehicle component 100 according to the example shown in FIG. 3A, wherein additional deformation zones 303-1, 301-2, 301-3 are formed. The vehicle component 100 is in particular a B pillar.

Furthermore, the component body 101 has flanges 305-1, 305-2, which are each arranged laterally on the component body 101 and at least partially delimit it. The further deformation zones 301-1, 301-2, 301-3 are rectangular, in particular formed with rounded corners. Further, the other deformation zones 301-1, 301-2, 301-3 may be formed according to the shape of the flanges 305-1, 305-2.

The deformation zone 105-3 and/or the further deformation zones 301-1, 301-2, 301-3 can have a greater tensile strength than the deformation zone 105-1, the tensile strength of the further deformation zones 301-1, 301-2, 301-3 may be different with respect to the deformation zone 105-3.

Figure 3C:
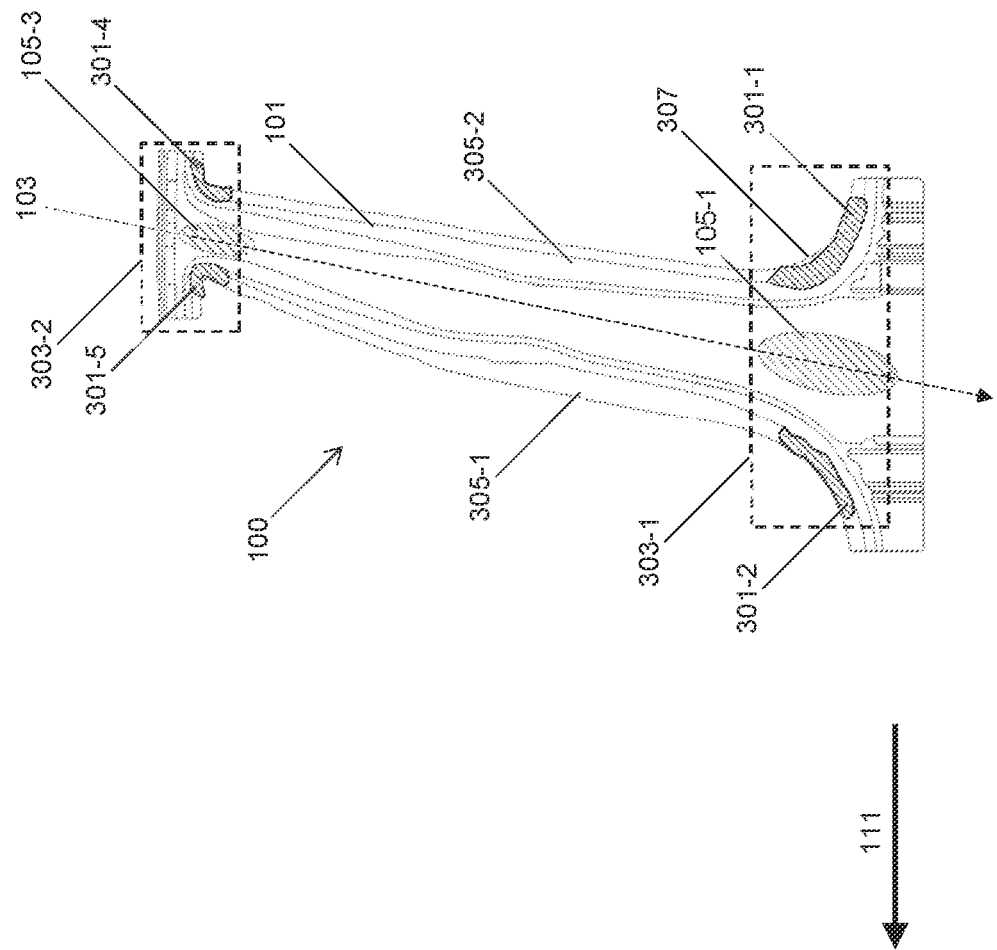
FIG. 3C shows a vehicle component in one example.

FIG. 3C shows a schematic representation of a vehicle component 100 that forms a B pillar, which can be arranged laterally on a vehicle. The vehicle component 100 corresponds to the example shown in FIG. 3A, wherein four further deformation zones 301-1, 301-2, 301-4, 301-5 are formed in the component body 101. The further deformation zones 301-1, 301-2, 301-4, 301-5 are arranged on an outer edge 307 of the vehicle component 100 and follow in their shape this outer edge 307. Furthermore, the further deformation zones 301-1, 301-2, 301-4, 301-5 may be disposed on a flat surface of the vehicle component 100 which has a curvature near zero with respect to the visual axis of the drawing.

The further deformation zones 301-1, 301-2, 301-4, 301-5 may be arranged in areas of increased curvature of the vehicle component 100, in particular at transition areas of the vehicle component 100 to a vehicle roof and/or a vehicle floor, with respect to the plane of the drawing.

The locally distributed deformation zones 105-1, 105-3, 301-1, 301-2, 301-4 301-5 form zone groups 303-2, 303-3 of deformation zones of different material hardness. The zone group 303-2 includes the deformation zones 105-1, 301-1 and 301-2. A deformation of the component body 101 upon a force acting on the component body 101 may in particular be concentrated, in particular restricted, to the zone groups 303-1, 303-2. The deformation zones 301-1, 301-2 may have an increased tensile strength compared to the deformation zone 105-1. Further, the deformation zones 301-4, 301-5 may have an increased tensile strength in view of the deformation zone 105-3.

Figure 4:
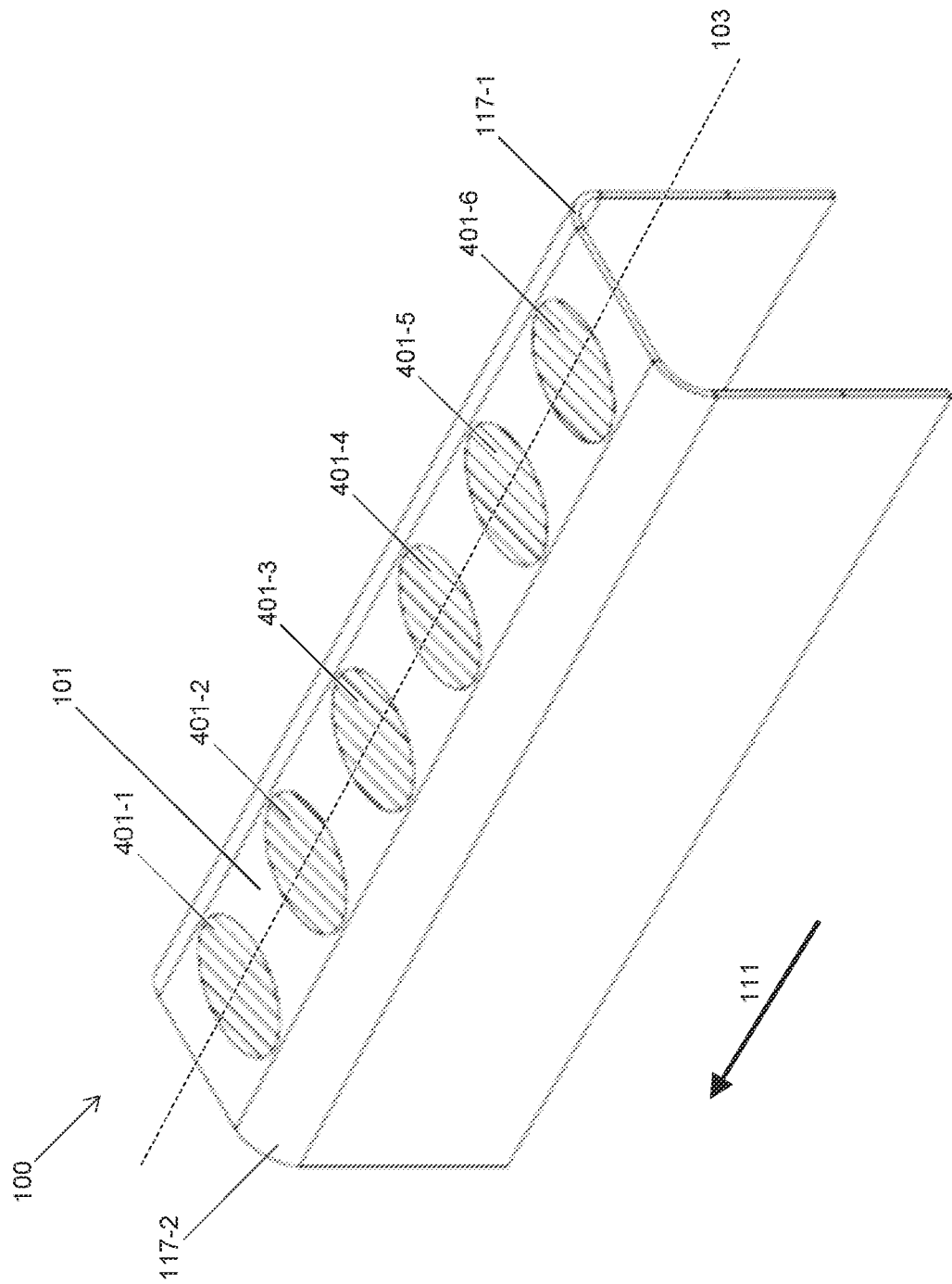
FIG. 4 shows a vehicle component in one example.

FIG. 4 shows a schematic representation of a vehicle component 100 that forms a deformation element that can be arranged in a rear end of a vehicle. The vehicle component 100 comprises a component body 101, which extends in a longitudinal direction 103 longitudinally. The component body 101 has in the longitudinal direction 103 locally distributed deformation zones 401-1 to 401-6, which are formed in the component body 101 of sheet material. At least two locally distributed and spaced-apart deformation zones of the deformation zones 401-1 to 401-6 have different tensile strengths in order to influence a deformation course of the component body 101 when a force is applied to the component body 101.

The component body 101 is formed as an U-shaped profile and the deformation zones 401-1 to 401-6 are arranged on a front side 402. The component body 101 may be aligned in the direction of travel 111 of the vehicle. Furthermore, the material hardness of the deformation zones 401-1 to 401-6 in the direction of travel 111 may increase in order to cause an accordion-type folding of the component body 101 and/or a force absorption at introduction points in the event of an impact.

LIST OF REFERENCE NUMBERS 100 vehicle component
101 component body
103 longitudinal direction
105-1 deformation zone
105-2 deformation zone
105-3 deformation zone
106-1 deformation zone boundaries
106-2 deformation zone boundaries
106-3 deformation zone boundaries
107 force-receiving area
109-1 deformation zone
109-2 deformation zone
109-3 deformation zone
109-4 deformation zone
111 direction of travel
113-1 zone group
113-2 zone group
115-1 sideband
115-2 sideband
117-1 curvature region
117-2 curvature region
119 cross-sectional axis
201-1 deformation zone
201-2 deformation zone
201-3 deformation zone
201-4 deformation zone
203-1 zone group
203-2 zone group
203-3 zone group
205-1 sideband
205-2 sideband
207-1 side surface
207-2 side surface
209 cross-sectional axis
211-1 longitudinal carrier
211-2 longitudinal carrier
301-1 deformation zone
301-2 deformation zone
301-3 deformation zone 301-4 deformation zone
301-5 deformation zone
303-1 zone group
303-2 zone group
305-1 flange
305-2 flange
307 outer edge
401-1 deformation zone
401-2 deformation zone
401-3 deformation zone
401-4 deformation zone
401-5 deformation zone
401-6 deformation zone

What is claimed is:

1. A vehicle component, comprising:
a component body extends longitudinally in a longitudinal direction, wherein the component body has locally distributed deformation zones in the longitudinal direction, wherein the locally distributed deformation zones are formed in the component body from sheet material, wherein at least two of the locally distributed deformation zones are spaced apart and have different tensile strengths in respect to each other configured to influence a deformation course of the component body upon a force acting on the component body, wherein a tensile strength of each of the locally distributed deformation zones is different from a tensile strength of the component body outside a respective locally distributed deformation zone, wherein the component body having the locally distributed deformation zones is formed from at least two mutually joined sheet metal blanks.

2. The vehicle component of claim 1, wherein the tensile strengths of at least two successive locally distributed deformation zones are decreasing or are increasing in the longitudinal direction of the component body.

3. The vehicle component of claim 1, wherein the tensile strengths of the locally distributed deformation zones differ by at least 20 MPa.

4. The vehicle component of claim 1, wherein the tensile strengths of the locally distributed deformation zones differ by at least 50 MPa.

5. A vehicle component, comprising:
a component body extends longitudinally in a longitudinal direction, wherein the component body has locally distributed deformation zones in the longitudinal direction, wherein the locally distributed deformation zones are formed in the component body from sheet material, wherein at least two of the locally distributed deformation zones are spaced apart and have different tensile strengths in respect to each other configured to influence a deformation course of the component body upon a force acting on the component body, wherein a tensile strength of each of the locally distributed deformation zones is different from a tensile strength of the component body outside a respective locally distributed deformation zone, wherein the component body has a force receiving region configured to receive the acting force, wherein a tensile strength of a first deformation zone of the locally distributed deformation zones, the first deformation zone being downstream of the force receiving region in the longitudinal direction, is lower than a tensile strength of a second deformation zone of the locally distributed deformation zones, the second deformation zone being downstream of the force receiving region and the first deformation zone in the longitudinal direction.

6. The vehicle component of claim 1, wherein the locally distributed deformation zones are configured to obtain the deformation course of the component body at the longitudinal direction.

7. The vehicle component of claim 6, wherein the deformation course of the component body comprises one or more of: a bend or a fold.

8. The vehicle component of claim 1, wherein each of the locally distributed deformation zones is at least partially enclosed by sheet material of the component body, wherein the tensile strength of the component body is different from a tensile strength of the respective locally distributed deformation zone.

9. The vehicle component of claim 1, wherein the component body having the locally distributed deformation zones is a thermoformed body.

10. The vehicle component of claim 1, wherein:
the component body is made of steel, and the tensile strengths of the locally distributed deformation zones are less than 1200 MPa; or
the component body is made of aluminum, and the tensile strengths of the locally distributed deformation zones are in a tensile strength range between 50 MPa and 400 MPa.

11. The vehicle component of claim 1, wherein the component body outside of the locally distributed deformation zones has an increased tensile strength by at least 5% with respect to the locally distributed deformation zones.

12. The vehicle component of claim 1, wherein the locally distributed deformation zones form zone groups of deformation zones of equal tensile strength.

13. The vehicle component of claim 1, wherein the tensile strengths of the locally distributed deformation zones are lower relative to the surrounding sheet material of the component body.

14. The vehicle component of claim 1, wherein the component body further comprises additional deformation zones distributed transversely to the longitudinal direction.

15. The vehicle component of claim 1, wherein the vehicle component comprises one or more of: a vehicle pillar, a carrier, a longitudinal beam, a cross member, a bumper, a battery container structure, or a vehicle body component.

16. A method of manufacturing a vehicle component for a vehicle, comprising:
forming a semi-finished product to a component body that extends longitudinally in a longitudinal direction; and
applying heat to the component body to produce in the longitudinal direction locally distributed deformation zones formed in the component body of sheet material, wherein at least two of the locally distributed deformation zones are spatially distributed and space apart, and wherein the at least two of the locally distributed deformation zones have different tensile strengths in respect to each other configured to influence a deformation course of the component body upon a force acting on the component body, wherein a tensile strength of each of the locally distributed deformation zones is different from a tensile strength of the component body outside the respective locally distributed deformation zone, wherein the component body further comprises additional deformation zones distributed transversely to the longitudinal direction.

17. The method of manufacturing of claim 16, wherein the component body having the locally distributed deformation zones is formed in one piece and without interruption from the sheet material.

18. The method of manufacturing of claim 16, wherein the component body having the locally distributed deformation zones is formed from at least two mutually joined sheet metal blanks.

19. The method of manufacturing of claim 16, wherein the component body having the locally distributed deformation zones is integrally formed from a same sheet metal material.

20. The method of manufacturing of claim 16, wherein the tensile strengths of at least two successive locally distributed deformation zones are decreasing or are increasing in the longitudinal direction of the component body.

* * * * *